(12) United States Patent
Boucké et al.

(10) Patent No.: US 12,377,632 B2
(45) Date of Patent: Aug. 5, 2025

(54) INSULATED PANEL AND METHOD OF MANUFACTURING AN INSULATED PANEL

(71) Applicant: I4F Licensing NV, Turnhout (BE)

(72) Inventors: Eddy Alberic Boucké, Menen (BE); Sander Gordon Zweed, Huizen (NL)

(73) Assignee: i4F Licensing NV, Turnhout (BE)

( * ) Notice: Subject to any disclaimer, the term of this patent is extended or adjusted under 35 U.S.C. 154(b) by 257 days.

(21) Appl. No.: 17/791,624

(22) PCT Filed: Jan. 11, 2021

(86) PCT No.: PCT/EP2021/050356
§ 371 (c)(1),
(2) Date: Jul. 8, 2022

(87) PCT Pub. No.: WO2021/140242
PCT Pub. Date: Jul. 15, 2021

(65) Prior Publication Data
US 2023/0039750 A1  Feb. 9, 2023

(30) Foreign Application Priority Data
Jan. 9, 2020 (NL) .................................. 2024628

(51) Int. Cl.
*B32B 5/18* (2006.01)
*B32B 5/24* (2006.01)
(Continued)

(52) U.S. Cl.
CPC ............... *B32B 5/18* (2013.01); *B32B 5/245* (2013.01); *B32B 7/12* (2013.01); *B32B 17/062* (2013.01); *B32B 33/00* (2013.01); *B32B 37/12* (2013.01); *B32B 2266/02* (2013.01); *B32B 2305/022* (2013.01); *B32B 2305/08* (2013.01); *B32B 2307/7145* (2013.01); *B32B 2307/72* (2013.01);
(Continued)

(58) Field of Classification Search
None
See application file for complete search history.

(56) References Cited

U.S. PATENT DOCUMENTS 3,172,072 A * 3/1965 Willy ...................... B29C 70/20
428/206
4,147,004 A 4/1979 Day et al.
(Continued)

FOREIGN PATENT DOCUMENTS

JP  S565727 U  1/1981
JP  H313334 A  1/1991
(Continued)

OTHER PUBLICATIONS

Ritter, "Neuer Hybridwerkstoff Aus Holz Und Metall Für Den Leichtbau," Fraunhofer WKI, 2019, pp. 1-2.
(Continued)

*Primary Examiner* — Chinessa T. Golden
(74) *Attorney, Agent, or Firm* — The Webb Law Firm

(57) ABSTRACT

The invention relates to an insulated panel, in particular a wall panel or roof panel, including a foamed core layer and a cover layer affixed to the foamed core layer. The invention also relates to an insulating covering, in particular a wall covering or floor covering, including a plurality said insulated panels.

19 Claims, 2 Drawing Sheets

(51) Int. Cl.
*B32B 7/12* (2006.01)
*B32B 17/06* (2006.01)
*B32B 33/00* (2006.01)
*B32B 37/12* (2006.01)

(52) U.S. Cl.
CPC ... *B32B 2307/7265* (2013.01); *B32B 2315/08* (2013.01); *B32B 2317/16* (2013.01); *B32B 2317/18* (2013.01); *B32B 2607/00* (2013.01)

(56) References Cited

U.S. PATENT DOCUMENTS

| | | | |
|---|---|---|---|
| 5,373,678 A * | 12/1994 | Hesser | E04C 2/292 52/592.1 |
| 5,780,519 A | 7/1998 | Imoto | |
| 2003/0033777 A1 | 2/2003 | Thiers et al. | |
| 2005/0095419 A1 * | 5/2005 | Raeburn | B32B 5/24 428/319.1 |
| 2010/0297414 A1 * | 11/2010 | Brentrup | B32B 5/22 428/317.1 |
| 2013/0065013 A1 | 3/2013 | Fischer et al. | |
| 2016/0046094 A1 * | 2/2016 | Beakler | B32B 21/042 428/528 |
| 2017/0368792 A1 * | 12/2017 | Faotto | B32B 5/18 |
| 2018/0202166 A1 | 7/2018 | Culpepper et al. | |
| 2020/0318292 A1 | 10/2020 | Aldén et al. | |
| 2023/0166427 A1 | 6/2023 | Hu et al. | |

FOREIGN PATENT DOCUMENTS

| | | |
|---|---|---|
| JP | H3176554 A | 7/1991 |
| JP | H6184896 A | 7/1994 |
| JP | H7329018 A | 12/1995 |
| JP | H885732 A | 4/1996 |
| JP | H1119907 A | 1/1999 |
| JP | 200394545 A | 4/2003 |
| JP | 201840105 A | 3/2018 |
| WO | 2013026956 A1 | 2/2013 |
| WO | 2018171913 A1 | 9/2018 |
| WO | 2018191181 A1 | 10/2018 |

OTHER PUBLICATIONS

Wisner et al., "Holzschaum für Sandwich-Elemente im Bauwesen," Aus Forschung und Entwicklung, pp. 34-41, vol. 63, Germany. Issue No. 1619-1919, DOI: 10.1007/s35145-019-0031-z.
Anonymous, "Wood foam a product on the rise?", Internet Citation, 2018, pp. 1-4.

* cited by examiner

INSULATED PANEL AND METHOD OF MANUFACTURING AN INSULATED PANEL

CROSS-REFERENCE TO RELATED APPLICATIONS

This application is the United States national phase of International Application No. PCT/EP2021/050356 filed Jan. 11, 2021, and claims priority to The Netherlands Patent Application No. 2024628 filed Jan. 9, 2020, the disclosures of which are hereby incorporated by reference in their entirety.

BACKGROUND OF THE INVENTION

Field of the Invention

The invention relates to an insulated panel, in particular a wall panel or roof panel. The invention also relates to an insulating covering, in particular a wall covering or floor covering, comprising a plurality said insulated panels. The invention further relates to a method of manufacturing an insulated panel, in particular a wall panel or roof panel.

Description of Related Art

Typically, insulating foam materials are applied thermo and sound insulating layer underneath floor coverings, in particular floating floors or for example behind wall coverings. The foam materials could be either closed-cell foam materials or open-cell foam materials and are typically at least partially made of polyurethane. Pre-constructed panels of solid foam materials could be applied, but it is also conceivable that the insulating materials is applied in semi-liquid form via spraying. A topic of increasing concern with those materials is the migration of possible harmful volatile and semi-volatile substances mainly due to nowadays improved or high efficiency constructed homes with limited ventilation. Building materials using (harmful) chemicals may affect the indoor air quality in a building and therefore the health of the people exposed thereto. A major risk is found during installation or use of spray foam building materials, where (volatile) chemical substances are found to cause skin, eye, and lung irritation, asthma, and chemical sensitization when absorbed through the skin or inhaled. When polyurethane is fully reacted or cured it is substantially stable and its chemistry is not a significant concern. However, some products, such as adhesives, coatings, and spray foam, react while being applied by builders or home-owners doing insulation retrofits, and continue to react for some hours afterwards, and may contain uncured isocyanates to which people may be exposed. Isocyanates, such as methylene diphenyl diisocyanate, are chemicals that react with polyols to form polyurethane and are specifically known for their toxic character. Another issue using polyurethane-based materials is the discussion of recyclability. Incineration of polyurethane will result in poisonous gas, but both physical and chemical recycling of polyurethane experiences several technical and economical difficulties. Hence, there is a demand to replace existing polyurethane based foam materials with all natural materials as a renewable and naturally sourced insulation layer.

SUMMARY OF THE INVENTION

It is a first goal of the invention to provide a wood based alternative to synthetic polymers based insulated panels, without comprising panel properties.

It is a second goal of the invention to provide an improved wood based insulated panel.

It is a third goal of the invention to provide an improved wood based insulated panel having improved properties over traditional polyurethane based foam materials At least one of these goals can be achieved by providing an insulated panel, in particular a wall panel or roof panel or floor panel, comprising
  a core comprising at least one foamed core layer, wherein the foamed core layer is at least partially made of wood foam, and
  at least one cover layer affixed, either directly or indirectly to the foamed core layer.

The use of a combination of foamed core layer comprising wood foam and a cover layer affixed to the foamed core layer has several advantages. However, to start with the benefits of wood foam as such, the material provides a high fire resistance, excellent sound dampening or sound insulation properties and a good heat insulation whilst still being a fully wood-based material. Further, wood foam is an extremely lightweight material due to its low density. It is experimentally found that wood foam has a sufficient resistance to moisture resulting in minimal bending or warping when submerged in water. Due to abovementioned qualities of wood foam the material is in particular suitable as thermo and/or sound insulating layer for roof, ceiling and/or wall coverings. Wood foam does not qualify as a composite and is therefore distinctive over wood polymer composites (WPC), as wood foam is based upon wood only, without mixing wood fibers with synthetic polymers such as PVC, PU, synthetic resin or synthetic glue. The wood foam structure can partly be assigned to the natural chemical bonding between wood fibers, which can be initiated by hydrogen peroxide added during the production process. These chemical forces on their own, however, are not enough to give adequate mechanical strength. A second factor being cause of the structure of wood foam is the physical anchorage and entanglement between (strands of) wood fibers. For example, untreated wood fibers have very smooth surfaces whereas in order to provide anchorages the fibers should be roughened. This could for example be done by grinding the base material in a refiner that has roughens the wood fibers thereby disintegrating their surface to a state where they are no longer able to slide past one another. Via the natural chemical bonding of the roughened wood fibers can than results in wood foams with relatively high mechanical strength which can be produced without using any adhesives. Wood foam typically has a substantially open pore structure. The foamed core layer is preferably a waterproof layer. Both hardwood and softwood, as well as other lignocelluloses, are suitable raw materials to produce wood foam. In particular the excellent heat insulating properties of the material make it rather suitable for use as material of the core layer of an insulated panel, in particular a wall panel or roof panel. The suitability is strengthened by its high fire resistance. In fact, in case of fire the insulated panel will smolder but shall also contribute in dying out of the fire. The latter is rather advantageous from environmental and security point of view.

The use of at least one cover layer affixed, either directly or indirectly to the foamed core layer is beneficial as such cover layer can provide a protective function for the foamed core layer. The use of both layers in a panel according to the present invention has several technical advantages. Due to both the foamed core layer and the cover layer being relatively light-weight combining such results in a relatively light-weight panel which is suitable for application in multiple building areas. The relatively high flexibility of material allows the use as curved or shaped wall panel, or for example as ceiling panel. The panels might also be used as exterior wall cladding as the overall load on the walls can be kept low due to the low weight and density. This also enables easier installation, including possible use of an alternative connecting system as conventional screw and/or nail connections might not be required. However, nailing and/or screwing of panels according to the invention is possible. Further, the combination of used materials is also suitable for, for example, sawing and gluing.

The material choice for wood foam has also several benefits of conventional natural materials. Wood foam benefits of a relatively high breathability which allows for the scape of captured moisture in a controlled manner. The lack of breathability is a common issue with traditional wood materials such as cedar or other soft woods which may result in wood rot. The panel preferably comprises natural materials in both the foamed core layer and the cover layer which is desirable from an environmental point of view. The cover layer typically provides a protective function for the wood foam foamed core layer. Both indoor and outdoor application of panels according to the present invention is conceivable, as well as use in dry and moist areas of the home, like for example in a bathrooms. The foamed core layer comprising wood foam can contribute to equalizing of the surface level. This is in particular beneficial when used in flooring, as the use of additional underflooring layers may be omitted but may also be useful when applying in wall- or roof constructions. The wood foam of the foamed core layer is preferably be configured such that desired sound and/or heat insulating properties for building applications can be obtained. Hence, it is conceivable that the panel according to the present invention replaces the use of a conventional floor, wall or ceiling panel having a separate insulating (polyurethane) layer. The panel according to the present invention has a good expectation of product lifetime. But also if panel(s) should be removed, recycling thereof is rather simple due to at least the core layer of the panel being substantially wood based. Furthermore, the panel even provides a competitively priced alternative to polyurethane based products, in particular for the more environmentally and health conscious consumers. In a further possible embodiment, it is conceivable that at least one foamed core layer is substantially entirely manufactured of wood foam.

Typically, at least one foamed core layer has a density between 30 kg/m3 and 300 kg/m3, preferably between 40 kg/m3 and 250 kg/m3. Here, the mechanical strength varies with the density of the wood foam: the higher the density, the closer the fibers are to one another and the stronger the wood's own bindings and the entanglement anchorages. A higher density may thus result in a higher mechanical strength. However, due to the internal anchoring in the wood foam, even a relatively low density may provide sufficient strength for the insulated panel whilst providing a considerable lightweight panel. It is further for example conceivable that at least one foamed core layer has a density between 30 kg/m3 and 300 kg/m3, preferably between 40 kg/m3 and 250 kg/m3. However, it is also conceivable that at least one foamed core layer has a density between 40 kg/m3 and 200 kg/m3 or between 40 kg/m3 and 150 kg/m3 or between 40 kg/m3 and 100 kg/m3. It is also conceivable that at least one foamed core layer has a density between 30 kg/m3 or 40 kg/m3 and 70 kg/m3 or 80 kg/m3.

As indicated already above, in a preferred embodiment of the panel according to the invention, at least one foamed core layer is substantially free of resin, binder and/or glue. Such embodiment is beneficial as health concerns from emissions from any of such additives could be eliminated. The foamed core layer is preferably also free of any other (chemical) synthetic additive(s), such as synthetic polymers. It is even conceivable that the foamed core layer solely consist of wood foam, in particular wood fibers and/or wood strands. It is also beneficial if the insulated panel as such is substantially free of resin, binder and/or glue. The wood foam of the foamed core layer typically consists of chemically bound wood fibers, wherein the wood fibers are additionally bound by physical anchorage and entanglement of wood fibers and/or strands of wood fibers.

In a possible embodiment, at least one cover layer of the insulated panel is at least partially made of densified wood. With regard to the cover layer which may comprise densified wood, the use of such material layer has several benefits. Densifying wood considerably enhances the mechanical properties of the wood. Densified wood can be obtained via an engineering process, an example thereof is given hereinafter. It is technically possible to compress wood to 20% of its original thickness resulting in so called complete densification. The densified as meant within the scope of this invention is typically compressed to at least 50% of its original thickness, preferably at least 40% and more preferably at least 30%. In order to obtain such densified wood, natural wood is first boiled in a solution of NaOH/Na2SO3 in order to obtain more porous and flexible wood. The wood is then to be compressed perpendicular to its growth direction at a temperature of at least 100° C. The process involves typically partially removing hemicellulose and lignin of the wood (the harder components of the wood), which is the glue that holds wood cells together. Complete removal of these may result in a poor-quality material, suggesting that some lignin is still required to bind the wood. The cellulose of the wood is left intact and the hydrogen-bonding between the closely spaced cellulose nanofibers enhance the strength of the densified wood. Hence, the densified wood of the cover layer is preferably composed of chemically treated, compressed wood. Preferably, the densified wood of the cover layer comprises less than 10% by weight of hemicellulose and/or less than 15% by weight of lignin. The densified wood obtained via this process is rather stable type and is not affected under humid conditions making it suitable for use in ceiling- and ceiling constructions, but for example also for flooring. Further, in addition to the excellent mechanical properties of the material, densified wood is a relatively lightweight material which is beneficial for constructing purposes. Densified wood is also suitable as cover layer due to its relatively high scratch-resistance. Instead of the term 'densified wood' also the term 'compressed wood' could be used. The densified wood could be radially densified wood and/or tangentially densified wood. Preferably, the densified wood of the cover layer is at least partially composed of hardwood, such as alder, balsa, beech, hickory, mahogany, maple, oak, teak, walnut, oak, and/or poplar. The hardwood used to make the cover layer preferably comes from angiosperm—or flowering plants—that are not monocots. Typically, the densified wood is waterproof. Hence, the cover layer is preferably a waterproof layer. It is for example also conceivable that at least one cover layer substantially entirely manufactured of densified wood.

In particular if a densified wood layer is applied as cover layer, an embodiment is conceivable wherein at least one foamed core layer and at least one cover layer are fused together. In this manner, the use of adhesive(s) and/or coupling agent(s) and/or coupling material)s) could be omitted. Due to the foamed core layer and cover layer both comprising wood based materials it is possible to fuse said layers together. Fusion could for example be thermal fusion, done by applying heat. The fusion of the core and cover layers typically results in a strong and solid connection between said layers. The change of delamination could also be significantly reduced. However, it is still imaginable that the cover layer(s) is/are glued to the foamed core layer(s).

It is also conceivable that at least one cover layer is at least partially made of a metal material. The cover layer being at least partially made of a metal material may provide a protective function for the wood foam. It is for example conceivable that the wood foam core layer is coated with a metallic material. It is for example also possible that the (partially) metal cover layer is relatively rigid, for example a metal sheet, such that the metal cover layer can form at least part of a metal casing. In the latter case, the insulated panel could easily be at least partially structured. At least one surface of the panel could for example be provided with a structured pattern. This could for example contribute to the possibility to use the panel as roof panel. The use of a cover layer which is at least partially made of a metal material may also enable easy including (interconnecting) coupling parts. It is also conceivable that at least one cover layer comprises a metal foil. Non-limiting examples of metal foils are aluminum foil, tin foil, metal leaf and/or composition leaf. The presence of a metal foil may further enhance the insulating character of the panel. Another possibility is the presence of at least one cover layer being at least partially made of natural fibers. Non-limiting examples are bamboo, hemp, linen, flax, jute, sisal, coconut and/or banana fibers. The natural fibers could for example at least partially be present in the form of a (woven) mat. Depending on the type used, natural fibers may benefit of good moisture-repellent properties, a good elasticity, good thermoregulatory properties and/or even being bacteria-repellent. Further, natural fibers typically benefit of a good ecological footprint due to a high sustainability and being low in pollutants. The combination of wood foam and natural fibers could thus contribute to the environmentally friendly character and/or the ease of recycling of the panel.

Possibly, the foamed core layer comprises at least one support structure. Such support structure could for example act as a distance element contributing to and/or supporting the spatial orientation of the foamed core layer. It is for example possible that at least one support element is substantially embedded within the foamed core layer.

The wood foam can for example be an open cell foam. The open cell foam structure of the wood foam could contribute to the breathability of the foamed core layer, and thus of the insulated panel. However, it is also conceivable that the wood foam is a closed cell foam. It is further conceivable that at least one foamed core layer comprises wood foam made of a single type of wood. A benefit of the use of a wood foam being made of a single type of wood is that it may be cheaper in production. It is also possible that multiple types of wood are used for the production of the wood foam. As already indicated above, the wood foam could for example be made of softwood or hardwood or a combination of both. Non-limiting examples of possible types of wood which could be used to made wood foam for use in the foamed core layer are: beech wood and/or pine wood.

It is further possible that the panel comprises a plurality of foamed core layers, wherein each foamed core layer comprises wood foam. In such embodiment, each foamed core layer may have a different density. It may be beneficial to provide a panel comprises multiple foamed core layers each comprising wood foam as herewith material properties such as the stiffness can be adapted in a relatively easy manner. The multiple foamed core layers could for example be mutually connected via a fusion process. A benefit thereof is that the use of adhesive(s) could be avoided. In a further possible embodiment, the panel may comprise at least one intermediate layer which is preferably enclosed between at least two foamed core layers, wherein the intermediate layer more preferably comprises densified wood. This configuration would allow for a lightweight panel to be constructed with aforementioned dampening and insulating properties however, with a substantially rigid spine for added torsional stiffness and rigidity.

As addressed above, the core preferably comprises at least one intermediate layer. Adding one or more intermediate layers to the core typically improves the acoustic and/or structural properties of the core, and hence of the panel as such. Preferably, at least one intermediate layer is at least partially enclosed at least one foamed core layer. More preferably, at least one, and preferably each, intermediate layer is substantially entirely surrounded by other core material, in particular one or more foamed core layers. Preferably, at least one intermediate layer is embedded in a foamed core layer or in between two adjacent foamed core layers of the core. Preferably, the intermediate layer is configured to act as reinforcement layer. This facilitates to make the panel suitable for use as roof panel, wall panel, or floor panel. This also makes it easier to profile the panel edges, in particular to make the panel suitable to be interconnected with another panel. Preferably, at least one intermediate layer comprises interconnected fibres. More preferably, the intermediate layer is forming a fiber mat, which could be a woven or non-woven mat. Typically the fibers are interconnected by means of a resin, such as a thermosetting resin. Preferably, the intermediate layer comprises (synthetic) fibres chosen from the group consisting of: glass fibres, carbon fibres, and/or aramid fibers. Preferably, the intermediate layer comprises natural fibres chosen from the group consisting of: flax, jute, hemp, abaca, ramie, cellulose, and/or kenaf. Hence, preferably, at least one intermediate layer is an open and/or porous layer, preferably a woven or non-woven mat. Preferably, at least one foamed core layer penetrates the intermediate layer or at least a fraction of the pores present in the intermediate layer. It is imaginable that the core comprises at least two foamed core (sub) layers which are mutually connected via through-holes in said intermediate layer.

Preferably, the core has a thickness T, and wherein the core comprises a plurality of embedded reinforcement layers, in particular, glass fiber layers, situated on both sides of the center line, defined by 0.5T, of the core. In case a single intermediate layer is applied, this intermediate layer could be positioned at the center line of the core. Alternatively, the single intermediate could be positioned in an upper section (which is typically preferred) or in a lower section of the core.

Preferably, during production of the panel, at least one intermediate layer is positioned in the aqueous wood pulp to be transformed to wood foam based foamed core layer, after which the wood pulp is dried and transformed into the foamed core layer, resulting in a foamed core layer having said intermediate layer embedded therein. This could also be considered as a preferred embodiment wherein the core comprises a plurality of integrally connected foamed layers incorporating at least one intermediate layer.

Preferably, the production of a wood foam based foamed core layer takes place by chipping wood and by further grinding the wood until wood dust is formed. Adding water and heating this mixture typically leads to a wood pulp. This lignocellulose comprising suspension further comprises hemicellulose and lignin, and typically also further wood residue. This latter residue fraction can subsequently be activated to act as binder (glue) to bind the wood particles/fibers during drying. Foaming of the suspension to a foam typically takes place by means of a foam stabilizer, such as protein, as well as by aerating the suspension, and by drying the suspension, typically at a temperature in the range of 80 and 140 degrees Celsius. This process makes is well suitable to introduce at least one intermediate layer in the suspension and to embed the intermediate layer(s) in the final foamed core layer during foaming and drying.

Instead of an open intermediate layer, the core may also, optionally additionally, comprise at least one closed intermediate layer. It is imaginable that the intermediate layer is at least partially made of densified wood.

Preferably, at least one foamed core layer has a thickness of 0.5 to 20 cm, preferably 1 to 15 cm, more preferably 2 to 10 cm. It is experimentally found that a foamed core layer according to the present invention having such thickness has good insulating properties whilst also providing sufficient stability for the panel as such. Depending on the desired application and the desired material characteristics, the thickness of the foamed core layer could be chosen. A relatively thick foamed core layer could for example provide improved (heat) insulating properties.

Typically, the cover layer has a density of at least 800 kg/m3, preferably at least 900 kg/m3, more preferably at least 1000 kg/m3. The density of the cover layer is typically substantially higher than the density of at least one foamed core layer. Possibly, the cover layer has a thickness of 1 to 7 mm, preferably 2 to 5 mm. However, if a (metal) foil is used as cover layer, the thickness may even be below 1 mm. Possibly the cover layer(s) is/are glued to the foamed core layer(s). Hence, at least one foamed core layer and at least one cover layer could be glued together. If a glue is applied, preferably a natural and/or non-toxic glue is used. Such natural glue could for example be made from organic sources such as natural resins and dextrin.

Possibly, at least one cover layer has an upper surface area exceeding an upper surface of the foamed core layer. Alternatively, the cover layer(s) may be attached to the foamed core layer(s) in an offset position. Both options typically make it easier to profile one or more edges, preferably the edges of the cover layer, in order to allow interconnecting of the panels during installation. In fact, it is also possible that the panel according to the present invention comprises at least one pair of opposite side edges which are provided with interconnecting coupling means. Such interconnecting coupling means could for example be a tongue and groove combination. It is possible that the interconnecting coupling means are provided in at least one foamed core layer and/or at least one cover layer.

In another beneficial embodiment, the panel comprises at least two cover layers which are both affixed, either directly or indirectly, onto an opposite side of the top of the at least one foamed core layer. Hence, basically a sandwich structure could be obtained wherein at least one foamed core layer is substantially enclosed by at least two cover layers. It is also conceivable that the foamed core layer is substantially surrounded by the cover layer(s). In such embodiment, the cover layer could further administer its protective function.

In a preferred embodiment, at least one cover layer is affixed, either directly or indirectly, on top of at least one foamed core layer. Here, a decorative top surface, if applied, may and preferably is at least partially formed by the cover layer. To protect the cover layer a protective coating may be used. In particular in case the cover layer comprises densified wood, such protective coating could an oil-based coating. It is also conceivable that the cover layer is provided with an oil-based coating. The application of an oil-based coating to the cover layer can enhance the dimension stability of the cover layer. Densified wood may get slightly weaker and/or swell under extremely humid condition, such as for a humidity of around 95% humidity. An oil-based coating may prevent this swelling and thus provide a protective coating to the cover layer. It is also imaginable that at least one foamed core layer is affixed, either directly or indirectly, on top of at least one cover layer.

It may also be preferred that the panel comprises a decorative top substrate affixed, either directly or indirectly, on top of the cover layer and/or the foamed core layer, wherein the decorative top substrate constitutes the decorative top surface of the panel. The top substrate may consist of a single layer or of a plurality of layers. Preferably, the top substrate, if applied, comprises at least one print layer and/or at least one protective (top) layer covering said print layer. The presence of a print layer and/or a protective layer could prevent the panel, and in particular the cover layer to possible damage from scratching and/or from environmental factors such as UV/moisture and/or wear and tear. It is also conceivable that if the cover layer comprises densified wood, that said densified wood cover layer is provided with an oil-based coating prior to at least one print layer and/or protective layer is applied. The print layer may be formed by a film onto which a decorative print is applied, wherein the film is affixed onto the cover layer and/or foamed core layer. The print layer may also be formed by at least one ink layer which is directly applied onto a top surface of the cover layer, the foamed core layer, or onto a primer layer applied onto the cover layer and/or the foamed core layer.

In another possible embodiment, the insulated panel may comprise at least one backing layer attached to a lower side of the foamed core layer. The backing layer could for example provide stability and/or protection to the panel. The backing layer may for example comprise a porous natural layer, in particular porous cellulose. The use of a porous cellulose backing layer would allow for the evaporation of moisture from the foamed core layer comprising wood foam during the manufacturing process whilst also allowing for the (semi-)porous backing layer to be in contact with part of a wall or ceiling, or roof construction which could offer advantages regarding the breathability of the panel. The presence of such porous backing layer may experience a greater absorption of convective heat radiation into the foamed core layer comprising wood foam. It is also possible that another natural fiber material is applied as backing layer, such as but not limited to a non-woven structure based on PLA. However, it is also possible that the backing layer is a non-porous natural layer, preferably a non-porous water vapor barrier layer. A possible non-limiting example of such layer is non-porous cellulose. A non-porous backing layer could prevent moisture from entering the foamed core layer comprising wood foam for areas with relatively high levels of moisture (e.g. bathrooms). Both the porous as well as non-porous backing materials will need to be manufactured from heat resistant or crystalline structure preferably, bio-based materials in order to survive the drying conditions used for the manufacture of the foamed core layer comprising wood foam.

It is further possible that at least one foamed core layer comprises at least one mineral material, in particular concrete. The use of at least one mineral material as filler in the foamed core layer may reduce water absorbance of the foamed core layer. It is for example possible that 5 to 15% by weight of mineral material is applied in the foamed core layer. Wood foam is sensitive to water absorbance, which is undesired as it can encourage fungal attack. The use of at least one mineral material, in particular in said amount, could significantly reduce the rate of water absorption of the wood foam. The use of at least one mineral material in the foamed core layer could also result in a higher density of the foamed core layer. Instead of a mineral material, it is also conceivable that at least one hydrophobic additive is applied, such as silane and/or wax. Said hydrophobic additives would however have a negative influence on the strength of the foamed core layer.

Preferably, each layer of the panel is a substantially waterproof layer. Preferably, the decorative panel as such is a waterproof panel. Preferably, the insulated panel as such is a thermally stable (temperature resistant) panel.

In a preferred embodiment of the decorative panel according to the invention, the panel is free of any cover layer. In another preferred embodiment of the insulated panel according to the invention, the panel is free of any wood foam based foamed core layer.

Preferably, at least one panel layer, in particular at least one foamed core layer and/or at least one decorative cover layer, comprises and/or is coated with at least one antimicrobial agent. The one or more incorporated antimicrobial agents inhibit(s) bacterial, fungal, microbial and other pathogen or non-pathogen growth and typically migrates to the tile surface in the course of time, thereby establishing a concentration gradient that controls the growth of microorganisms on contact with the tile surface. Preferably, the antimicrobial agent is selected from (i) organic or organometallic antimicrobial substances such as halogenated phenyl ethers, halogenated salicylanilides, sesquiterpene alcohols, halogenated carbanilides, bisphenolic compounds, general phenols, formaldehyde, quaternary ammonium compounds, pyridine derivatives and hexachlorophene, and/or from (ii) inorganic antimicrobials substance including silver, zinc, or copper in glass or ceramic matrices, wherein the antimicrobial agent preferably comprises 2,4,4'-trichloro-2'-hydroxydiphenyl ether. Said antimicrobial agent may also be a chemical selected from the group consisting of triclosan, ortho phenyl phenol, diiodomethyl p-tolylsulfone, zinc pyrithiones, sodium pyrithiones, azoles, such as propiconazoles, poly(hexamethylene biguanide) hydrochloride, 3,4,4'trichlorocarbanilide, barium mono hydrate and silver, copper or zinc in zeolite or amorphous glass powder. It is imaginable and rather practical to mix at least one antimicrobial agent with wood foam (or with precursor wood pulp suspension) during production of the foamed layer.

The invention further relates to a insulating covering, in particular an insulating wall covering, insulating ceiling covering, or insulating roof covering, or insulating floor covering, comprising a plurality of insulated panels according to the present invention. As indicated above, due to the relatively high flexibility of the layers the covering can be applied in a curved or shaped configuration.

The invention further relates to a method of manufacturing an insulated panel, in particular a wall panel or roof panel, preferably according to the present invention, the method comprising the steps of:

a) providing at least one foamed core layer comprising an upper side and a lower side, wherein the foamed core layer comprises wood foam,
b) providing at least one decorative cover layer comprising densified wood, and
c) affixing at least one cover layer onto the upper side and/or lower side of the foamed core layer.

Embodiments of the invention are further illustrated in the non-limitative set of clauses presented below:

1. Insulated panel, in particular a wall panel, roof panel, or floor panel, comprising:
   a core comprising at least one foamed core layer, wherein the foamed core layer is at least partially made of wood foam, and
   at least one cover layer affixed, either directly or indirectly, to the foamed core layer.

2. Panel according to clause 1, wherein at least one foamed core layer has a density between 30 and 300 kg/m3, preferably between 40 and 250 kg/m3.

3. Panel according to any of the previous clauses, wherein at least one foamed core layer is substantially free of resin, binder and/or glue.

4. Panel according to any of the previous clauses, wherein at least one foamed core layer is substantially free of any synthetic polymer.

5. Panel according to any of the previous clauses, wherein the wood foam of the foamed core layer consists of chemically bound wood fibers, and wherein the wood fibers are additionally bound by physical anchorage and entanglement of wood fibers and/or strands of wood fibers.

6. Panel according to any of the previous clauses, wherein at least one cover layer is at least partially made of densified wood.

7. Panel according to any of the previous clauses, wherein at least one cover layer is at least partially made of a metal material.

8. Panel according to any of the previous clauses, wherein at least one cover layer comprises a metal foil.

9. Panel according to any of the previous clauses, wherein at least one cover layer is at least partially made of natural fibers.

10. Panel according to any of the previous clauses, wherein the foamed core layer comprises at least one support structure.

11. Panel according to any of the previous clauses, wherein the wood foam is an open cell foam.

12. Panel according to any of the previous clauses, wherein the panel comprises a plurality of foamed core layers, wherein each foamed core layer comprises wood foam.

13. Panel according to one of the previous clauses, wherein the core comprises at least one intermediate layer.

14. Panel according to clause 13, wherein at least one intermediate layer is at least partially enclosed at least one foamed core layer.

15. Panel according to clause 13 or 14, wherein at least one intermediate layer is embedded in a foamed core layer or in between two adjacent foamed core layers.

16. Panel according to any of clauses 13-15, wherein the intermediate layer is configured to act as reinforcement layer.

17. Panel according to any of clauses 13-16, wherein the intermediate layer comprises interconnected fibres.

18. Panel according to one of clauses 13-17, wherein the intermediate layer comprises fibres chosen from the group consisting of: glass fibres, carbon fibres, and/or aramid fibres.

19. Panel according to one of clauses 13-18, wherein the intermediate layer comprises natural fibres chosen from the group consisting of: flax, jute, hemp, abaca, ramie, cellulose, and/or kenaf.

20. Panel according to one of clauses 13-19, wherein the intermediate layer is an open and/or porous layer, preferably a woven or non-woven mat.

21. Panel according to one of clauses 13-20, wherein at least one foamed core layer penetrates the intermediate layer.

22. Panel according to one of clauses 13-21, the core comprises at least two foamed core layers which are mutually connected via through-holes in said intermediate layer.

23. Panel according to one of clauses 13-22, wherein the core comprises a plurality of integrally connected foamed layers incorporating at least one intermediate layer.

24. Panel according to one of clauses 13-23, wherein the core has a thickness T, and wherein the core comprises a plurality of embedded reinforcement layers, in particular, glass fiber layers, situated on both sides of the center line, defined by 0.5T, of the core.

25. Panel according to any of the clauses 13-24, wherein the core comprises at least one closed layer.

26. Panel according to any of the clauses 13-25, wherein the intermediate layer is at least partially made of densified wood.

27. Panel according to any of the previous clauses, wherein at least one foamed core layer has a thickness of 0.5 to 20 cm, preferably 1 to 15 cm, more preferably 2 to 10 cm.

28. Panel according to any of the previous clauses, wherein the cover layer has a density of at least 800 kg/m3, preferably at least 900 kg/m3, more preferably at least 1000 kg/m3.

29. Panel according to any of the previous clauses, wherein the cover layer has a thickness of 1 to 10 mm, preferably 2 to 7 mm.

30. Panel according to any of the previous clauses, wherein at least one foamed core layer and at least one cover layer are fused together.

31. Panel according to any of the previous clauses, wherein at least one foamed core layer and at least one cover layer are glued together.

32. Panel according to any of the previous clauses, wherein the cover layer has an upper surface area exceeding an upper surface of the foamed core layer.

33. Panel according to any of the previous clauses, comprising at least two cover layers which are both affixed, either directly or indirectly, onto an opposite side of the top of the at least one foamed core layer.

34. Panel according to any of the previous clauses, comprising at least one pair of opposite side edges which are provided with interconnecting coupling means.

35. Panel according to any of the previous clauses, wherein at least one foamed core layer comprises a mineral material, in particular concrete.

36. Panel according to any of the previous clauses, wherein each layer of the panel is a substantially waterproof layer.

37. Panel according to any of the previous clauses, wherein the panel is free of any cover layer.

38. Panel according to any of the previous clauses, wherein the panel is free of any wood foam based foamed core layer.

39. Insulating covering, in particular a wall covering or floor covering, comprising a plurality of insulated panels according to any of clauses 1-38.

40. Method of manufacturing an insulated panel, in particular a wall panel or roof panel, preferably according to any of clause 1-38, comprising the steps of:
   a) providing at least one foamed core layer comprising an upper side and a lower side, wherein the foamed core layer comprises wood foam,
   b) providing at least one decorative cover layer comprising densified wood, and
   c) affixing at least one cover layer onto the upper side and/or lower side of the foamed core layer.

BRIEF DESCRIPTION OF THE DRAWINGS

The invention will be elucidated on the basis of non-limitative exemplary embodiments shown in the following figures. Herein shows.

DESCRIPTION OF THE INVENTION

Figure 1:
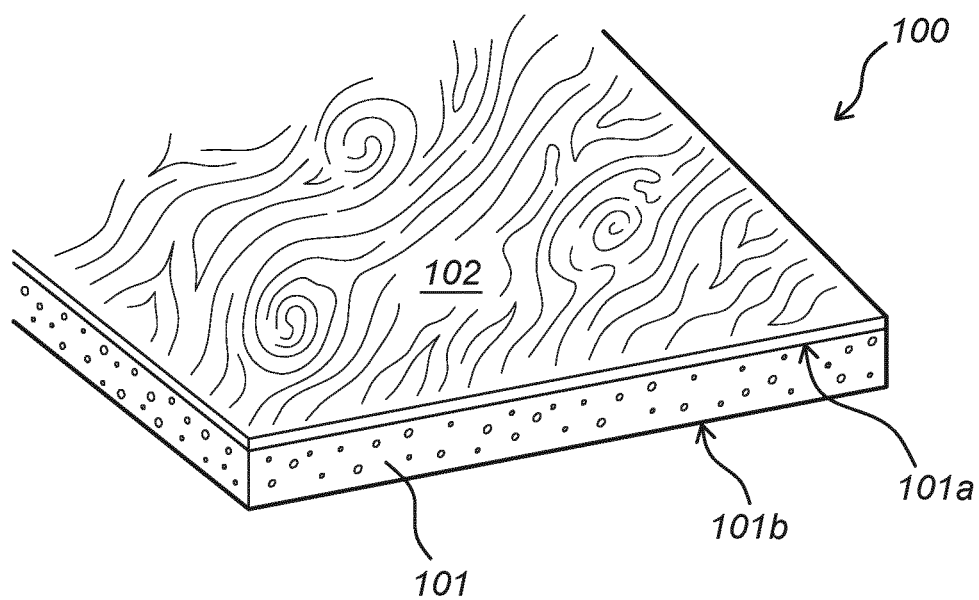
FIG. 1 a perspective view of a first possible embodiment of an insulated panel according to the present invention.

FIG. 1 shows an insulated panel 100 comprising a foamed core layer 101 which is at least partially made of wood foam, and a cover layer 102 affixed to the foamed core layer 101. The panel 100 could for example be used as wall panel or roof panel. The foamed core layer 101 comprises an upper side 101a and a lower side 101b. The cover layer 102 is affixed on said upper side 101a of the foamed core layer 101. The foamed core layer 101 comprises wood foam, the wood foam has preferably a substantially open pore structure. The cover layer 102 comprises densified wood. In the shown embodiment, the cover layer 102 is directly attached to the foamed core layer 101, in particular via fusion.

Figure 2:
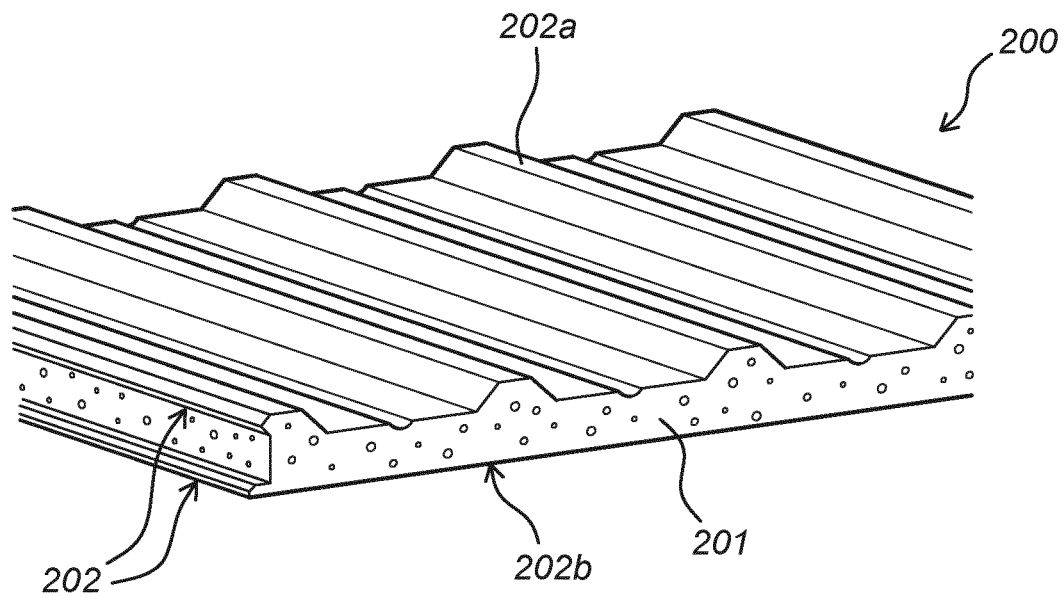
FIG. 2 a perspective view of a second possible embodiment of an insulated panel according to the present invention.

FIG. 2 shows a perspective view of a second possible embodiment of an insulated panel 200 according to the present invention. The panel 200 comprises a wood foam core layer 201 and two cover layers 202a, 202b. The core layer 201 is in fact substantially enclosed between the cover layers 202a, 202b. In the shown embodiment, the cover layers 202a, 202b are made of a metal material. Hence, the wood foam of the foamed core layer 201 is shielded by the cover layer 202a, 202b. The metal cover layers 202a, 202b in fact form a metal casing surrounding the core layer 201. Each cover layer 202a, 202b has an upper surface area exceeding an upper surface of the foamed core layer 201. The panel 200, and in particular the cover layers 202a, 202b is provided with interconnecting coupling means 203 allowing easier installation of the panel. The panel 200 of the shown embodiment is provided with a structured upper surface, and also the lower surface of the panel is slightly structured. This may also contribute to the ease of use of the insulating panel 200, for example in the application as roof panel 200.

Figure 3:
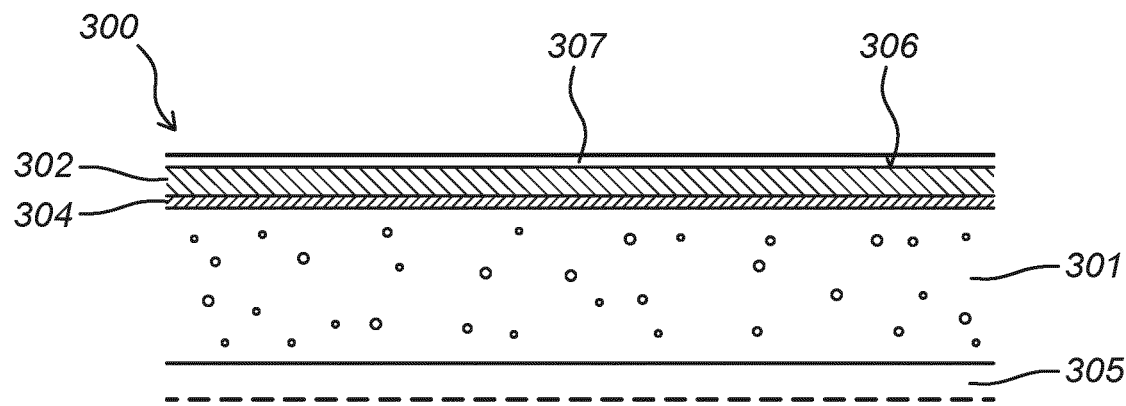
FIG. 3 a cross-sectional view of a third possible embodiment of an insulated panel according to the present invention.

FIG. 3 shows a cross-sectional view of a third possible embodiment of an insulated panel 300 according to the present invention. The panel 300 comprises a foamed core layer 301 comprising wood foam and a cover layer 302 which is attached to the foamed core layer via an adhesive layer 304. Optionally, the panel 300 comprises a backing layer 305 attached to a lower side of the foamed core layer 301. Also optionally, the panel 300 may comprise a print layer 306 and/or at least one protective layer 307.

Figure 4:
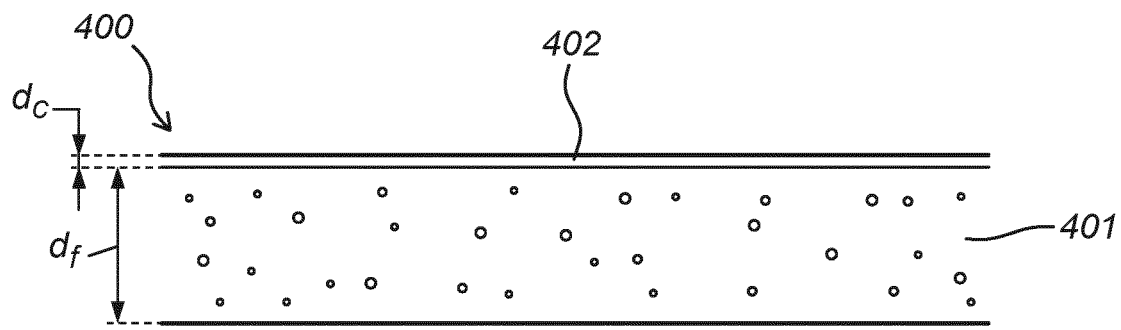
FIG. 4 a cross-sectional view of a fourth possible embodiment of an insulated panel according to the present invention.

FIG. 4 shows a cross-sectional view of a fourth possible embodiment of an insulated panel 400 according to the present invention. The foamed core layer 401 comprising wood foam is attached to a cover layer 402 made of metal foil. It can be seen that the thickness d,f of the foamed core layer 401 is substantially larger than the thickness d,c of the cover layer 402.

Figure 5:
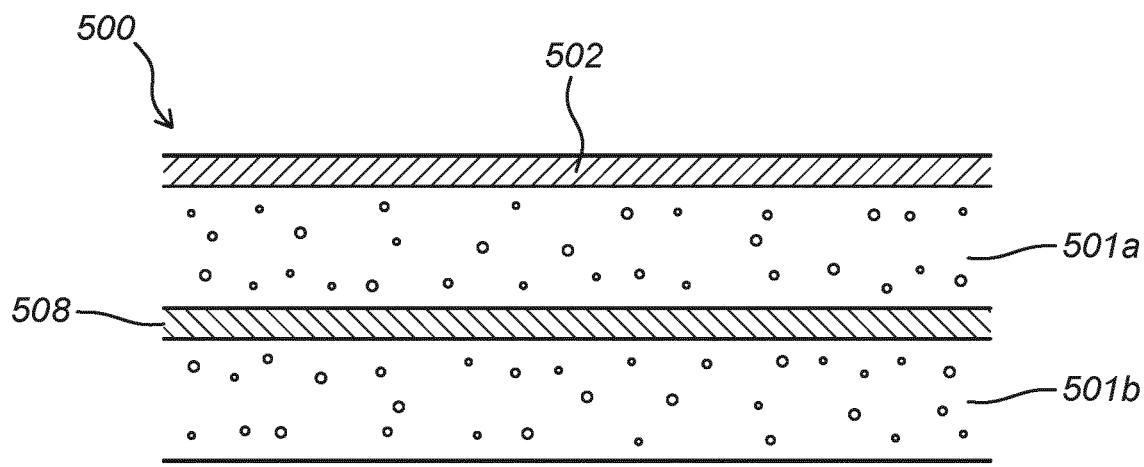
FIG. 5 a cross-sectional view of a fifth possible embodiment of an insulated panel according to the present invention.

FIG. 5 shows a cross-sectional view of a fifth possible embodiment of an insulated panel 500 according to the present invention. The panel 500 comprises a cover layer 502. The panel 500 also comprises at least one intermediate layer 508 which is enclosed between two foamed core layers 501*a*, 501*b*. The intermediate layer 508 may comprises densified wood and/or a fiber-based reinforcement layer, and can be provided with interconnecting coupling profiles (not shown). It is also conceivable that the intermediate layer 508 comprises another natural material, like e.g., preferably interconnected, natural fibres chosen from the group consisting of: flax, jute, hemp, abaca, ramie, cellulose, and/or kenaf. Instead of natural fibers also synthetic fibers, like glass fibers, carbon fibers, and/or aramid fibers may be used. In case the intermediate layer 508 comprises, preferably interconnected, fibers and constitutes an open and/or porous layer, preferably a woven or non-woven mat, in which one or both of the foamed core layers 501*a*, 501*b* are penetrated. Preferably, the foamed core layers 501*a*, 501*b* are mutually connected via through-holes formed in the intermediate layer 508. In this embodiment, it is shown that the intermediate layer 508 is positioned at the center line of the core of the panel 500, wherein the core is formed by the laminate of the lower foamed core layer 501*b*, the intermediate layer 508, and the upper foamed core layer 501*a*.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

It will be apparent that the invention is not limited to the working examples shown and described herein, but that numerous variants are possible within the scope of the attached claims that will be obvious to a person skilled in the art. When the term insulated panel is used, it could also be referred to an insulating panel. The insulated panel according to the present invention is typically also suitable for use as floor panel.

The verb "comprise" and conjugations thereof used in this patent publication are understood to mean not only "comprise", but are also understood to mean the phrases "contain", "substantially consist of", "formed by" and conjugations thereof.

The invention claimed is:

1. An insulated panel comprising:
   a core comprising at least one foamed core layer, wherein the foamed core layer is made of wood foam, wherein the core comprises at least one intermediate layer, and
   at least one cover layer affixed, either directly or indirectly, to the core;
   wherein the intermediate layer is at least partially made of densified wood.

2. The panel according to claim 1, wherein at least one intermediate layer is at least partially enclosed at least one foamed core layer.

3. The panel according to claim 1, wherein at least one intermediate layer is embedded in a foamed core layer or in between two adjacent foamed core layers.

4. The panel according to claim 1, wherein the intermediate layer is configured to act as reinforcement layer.

5. The panel according to claim 1, wherein at least one foamed core layer penetrates the intermediate layer.

6. The panel according to claim 1, wherein the core comprises at least two foamed core layers which are mutually connected via through-holes in said intermediate layer.

7. The panel according to claim 1, wherein the core has a thickness T, and wherein the core comprises a plurality of embedded reinforcement layers situated on both sides of a center line, defined by 0.5T, of the core.

8. The panel according to claim 1, wherein at least one foamed core layer has a density between 30 and 300 kg/m3.

9. The panel according to claim 1, wherein the wood foam of the foamed core layer consists of chemically bound wood fibers, and wherein the wood fibers are additionally bound by physical anchorage and entanglement of wood fibers and/or strands of wood fibers.

10. The panel according to claim 1, wherein at least one foamed core layer has a thickness of 0.5 to 20 cm.

11. The panel according to claim 1, wherein the cover layer has a density of at least 800 kg/m3.

12. The panel according to claim 1, wherein the cover layer has a thickness of 1 to 10 mm.

13. The panel according to claim 1, wherein at least one foamed core layer and at least one cover layer are glued together.

14. The panel according to claim 1, comprising at least one pair-of opposite side edges which are provided with interconnecting coupling means.

15. The panel according to claim 1, wherein each layer of the panel is a waterproof layer.

16. The panel according to claim 1, wherein at least one panel layer comprises and/or is coated with at least one antimicrobial agent.

17. An insulating covering comprising a plurality of γinsulated panels according to claim 1.

18. The panel according to claim 1, wherein the at least one cover layer is affixed to the at least one foamed core layer of the core.

19. A method of manufacturing an insulated panel according to claim 1, comprising the steps of:
   a) providing at least one foamed core layer comprising an upper side and a lower side, wherein the foamed core layer comprises wood foam,
   b) providing at least one decorative cover layer comprising densified wood, and
   c) affixing at least one cover layer onto the upper side and/or lower side of the foamed core layer.

* * * * *

UNITED STATES PATENT AND TRADEMARK OFFICE
CERTIFICATE OF CORRECTION

PATENT NO. : 12,377,632 B2  
APPLICATION NO. : 17/791624  
DATED : August 5, 2025  
INVENTOR(S) : Eddy Alberic Boucké et al.

Page 1 of 1

It is certified that error appears in the above-identified patent and that said Letters Patent is hereby corrected as shown below:

In the Claims

Column 14, Line 50, Claim 17, delete "γinsulated" and insert -- insulated --

Signed and Sealed this  
Twenty-first Day of October, 2025

John A. Squires  
*Director of the United States Patent and Trademark Office*